United States Patent
Shanbhogue et al.

(10) Patent No.: US 10,255,196 B2
(45) Date of Patent: Apr. 9, 2019

(54) METHOD AND APPARATUS FOR SUB-PAGE WRITE PROTECTION

(71) Applicant: Intel Corporation, Santa Clara, CA (US)

(72) Inventors: Vedvyas Shanbhogue, Austin, TX (US); Christopher Bryant, Austin, TX (US); Jeff Wiedemeier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/979,038

(22) Filed: Dec. 22, 2015

(65) Prior Publication Data

US 2017/0177500 A1    Jun. 22, 2017

(51) Int. Cl.
| | | |
|---|---|---|
| G06F 12/10 | (2016.01) | |
| G06F 12/1045 | (2016.01) | |
| G06F 12/0875 | (2016.01) | |
| G06F 12/1027 | (2016.01) | |
| G06F 12/14 | (2006.01) | |

(52) U.S. Cl.
CPC ...... *G06F 12/1045* (2013.01); *G06F 12/0875* (2013.01); *G06F 12/1027* (2013.01); *G06F 12/1475* (2013.01); *G06F 2212/1024* (2013.01); *G06F 2212/452* (2013.01); *G06F 2212/684* (2013.01)

(58) Field of Classification Search
CPC ...... G06F 12/10; G06F 12/08; G06F 12/1045; G06F 12/0875; G06F 2212/452; G06F 2212/684; G06F 2212/1024; G06F 12/1027; G06F 12/1475
See application file for complete search history.

(56) References Cited

U.S. PATENT DOCUMENTS

| | | | | |
|---|---|---|---|---|
| 5,440,710 | A | * | 8/1995 | Richter ............... G06F 11/3648 703/23 |
| 2005/0076324 | A1 | | 4/2005 | Lowell et al. |
| 2005/0273571 | A1 | | 12/2005 | Lyon et al. |

(Continued)

OTHER PUBLICATIONS

International Search Report and Written Opinion for Application No. PCT/US2016/066668, dated Jun. 12, 2017, 11 pages.

(Continued)

*Primary Examiner* — David Yi
*Assistant Examiner* — Zubair Ahmed
(74) *Attorney, Agent, or Firm* — Nicholson De Vos Webster & Elliott LLP

(57) ABSTRACT

An apparatus and method for sub-page extended page table protection. For example, one embodiment of an apparatus comprises: a page miss handler to perform a page walk using a guest physical address (GPA) and to detect whether a page identified with the GPA is mapped with sub-page permissions; a sub-page control storage to store at least one GPA and other data related to a sub-page; the page miss handler to determine whether the GPA is programmed in the sub-page control storage; and the page miss handler to send a translation to a translation lookaside buffer (TLB) with a sub-page protection indication set to cause a matching of the sub-page control storage when an access matches a TLB entry with sub-page protection indication.

16 Claims, 15 Drawing Sheets

(56) References Cited

U.S. PATENT DOCUMENTS

| | | | |
|---|---|---|---|
| 2014/0006681 A1* | 1/2014 | Chen | G06F 12/1027 711/3 |
| 2014/0189274 A1 | 7/2014 | Hildesheim et al. | |
| 2014/0201495 A1 | 7/2014 | Hyuseinova et al. | |
| 2014/0351553 A1 | 11/2014 | Falik et al. | |

OTHER PUBLICATIONS

International Preliminary Report on Patentability for Application No. PCT/US2016/066668, dated Jul. 5, 2018, 8 pages.

* cited by examiner

SPP bit vector 1201

| Pos 63 | | | | | | | Pos 0 |
|---|---|---|---|---|---|---|---|
| R/D | W/XD | R/D | W/XD | ... | R/D | W/XD | R/D | W/XD |

Legend: R=Read, W=Write, XD=exec disable, *=don't care

1202

| SPP | R | W | XD | Interpretation | SPP bit vector |
|---|---|---|---|---|---|
| 1 | 0 | 0 | 0 | Read/Exec SPP | Even – Write/XD, Odd – Read/Dirty |
| 1 | 0 | 0 | 1 | Read SPP | Even – Write/XD=*, Odd – Read/Dirty |
| 1 | 0 | 1 | 0 | Read/Exec SPP | Even – Write/XD, Odd – Read/Dirty |
| 1 | 0 | 1 | 1 | Read SPP | Even – Write/XD=*, Odd – Read/Dirty |
| 1 | 1 | 0 | 0 | Write/Exec SPP | Even - Write/XD, Odd – Read/Dirty |
| 1 | 1 | 0 | 1 | Write SPP | Even – Write/XD, Odd – Read/Dirty |
| 1 | 1 | 1 | 0 | RW allowed – No data side SPP | Even – Write/XD, Odd – Read/Dirty=* |
| 1 | 1 | 1 | 1 | RWX allowed - No data side SPP | -- |

FIG. 12

METHOD AND APPARATUS FOR SUB-PAGE WRITE PROTECTION

BACKGROUND

Field of the Invention

This invention relates generally to the field of computer processors. More particularly, the invention relates to an apparatus and method for sub-page write protection.

Description of the Related Art

A virtual-machine system is a computer system that includes a virtual machine monitor (VMM) supporting one or more virtual machines (VMs). A Virtual Machine Monitor (VMM) is a software program that controls physical computer hardware and presents programs executing within a Virtual Machine (VM) with the illusion that they are executing on real physical computer hardware. Each VM typically functions as a self-contained platform, controlled by a "guest" operating system (OS), i.e., an OS hosted by the VMM, which executes as if it were running on a real machine instead of within a VM.

In some implementations, the virtual execution environment is supported by a "host" operating system (OS) which is natively executed on the computing hardware. The host OS may support multiple different "guest" OSs, each potentially running multiple different applications. In this implementation, non-native instructions executed by the applications are intercepted, decoded and translated to native instructions by logic within the host OS. The results of the native instructions are then provided back to the applications from the host OS. In addition to non-native general purpose instructions, non-native graphics instructions may also need to be intercepted, decoded and translated into native graphics instructions for execution on a graphics processing unit (GPU).

Extended Page Table (EPT)-based Sub-Page Protection allows VMMs to specify write-protection for guest physical memory at a sub-page (128 byte) granularity. When this capability is utilized, the CPU enforces write-access permissions for sub-page regions of 4K pages as specified by the VMM. EPT-based Sub-Page Protection is intended to enable fine-grained memory write enforcement by a VMM for security (guest OS monitoring) and usages such as device virtualization and memory checkpointing.

BRIEF DESCRIPTION OF THE DRAWINGS

A better understanding of the present invention can be obtained from the following detailed description in conjunction with the following drawings, in which:

FIG. 12 illustrates an embodiment in which read (R), write (W), execute disable (XD), and Dirty bits are expressed in the 64-bit vector;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
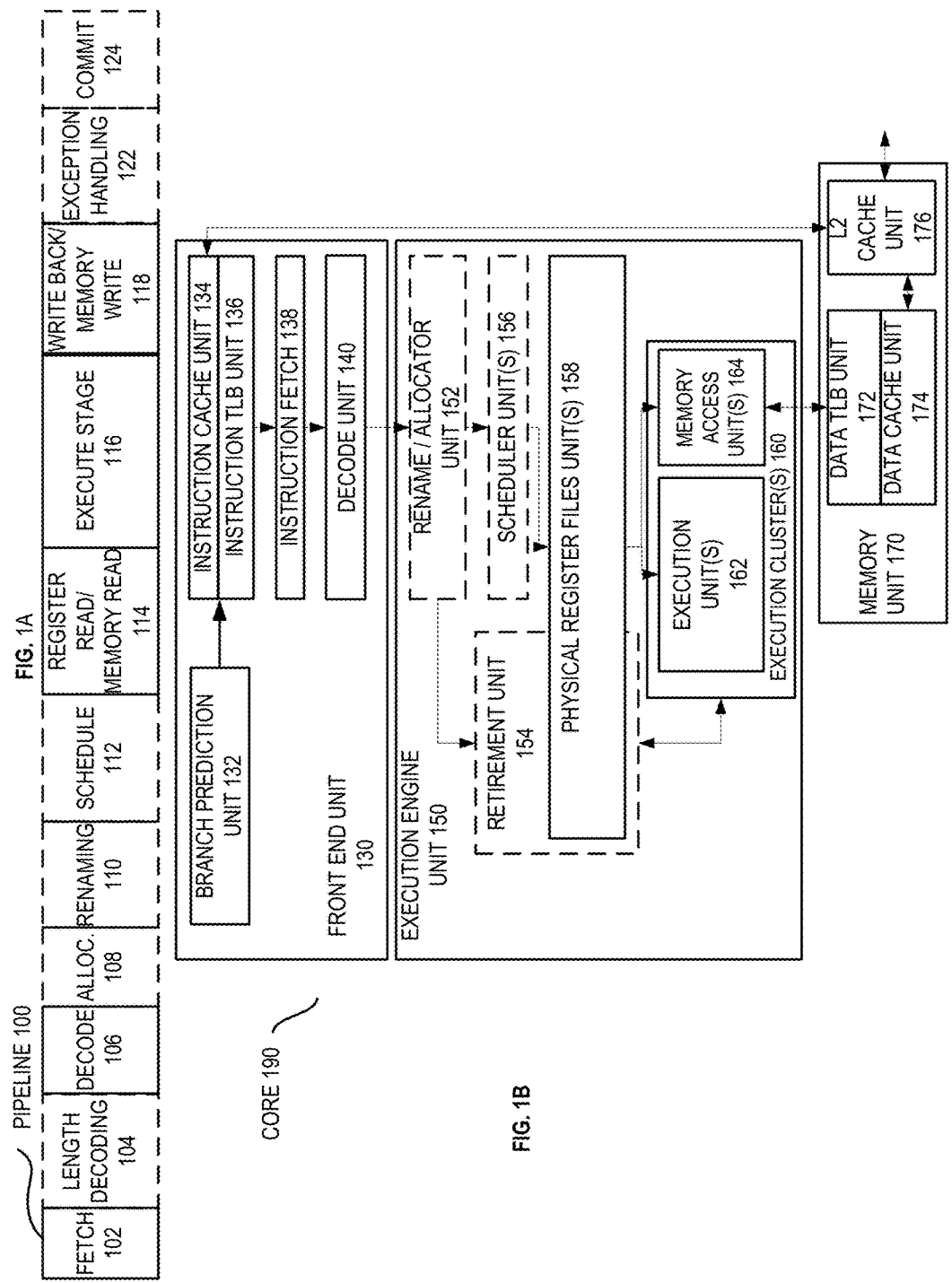
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point-status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
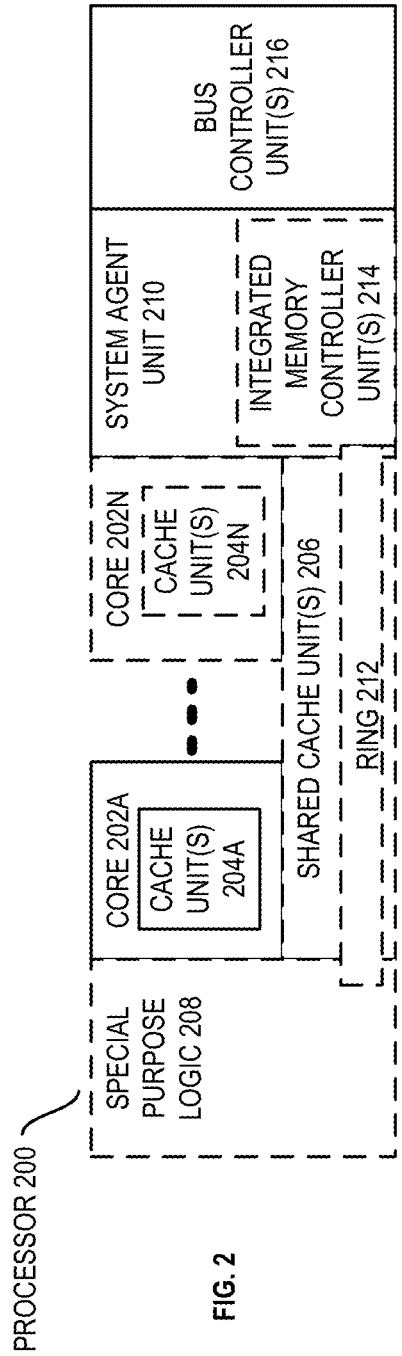
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
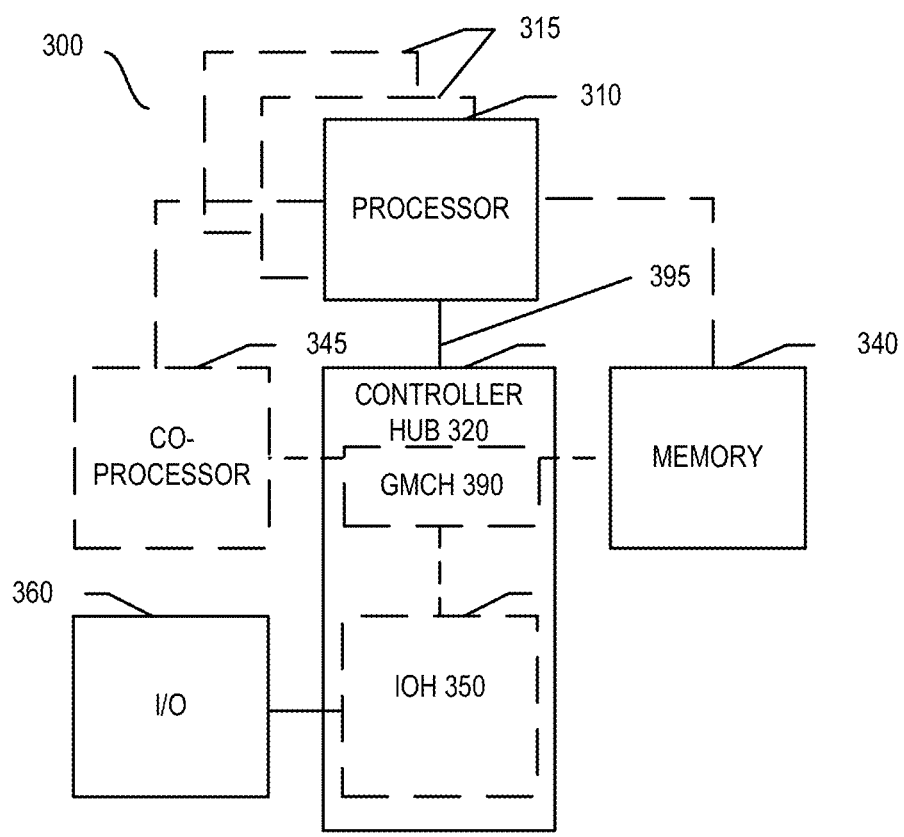
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the 10H 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
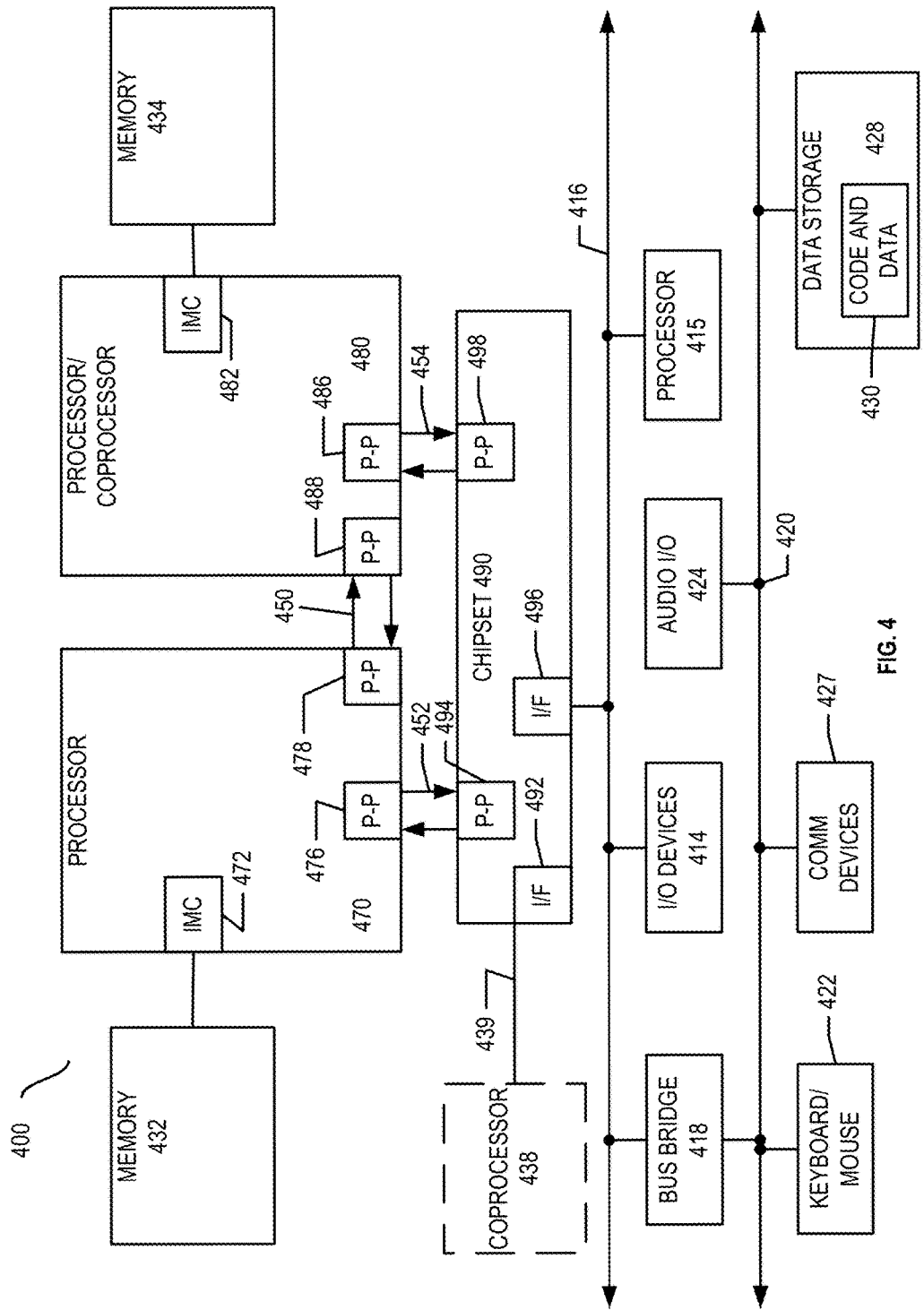
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG.

4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
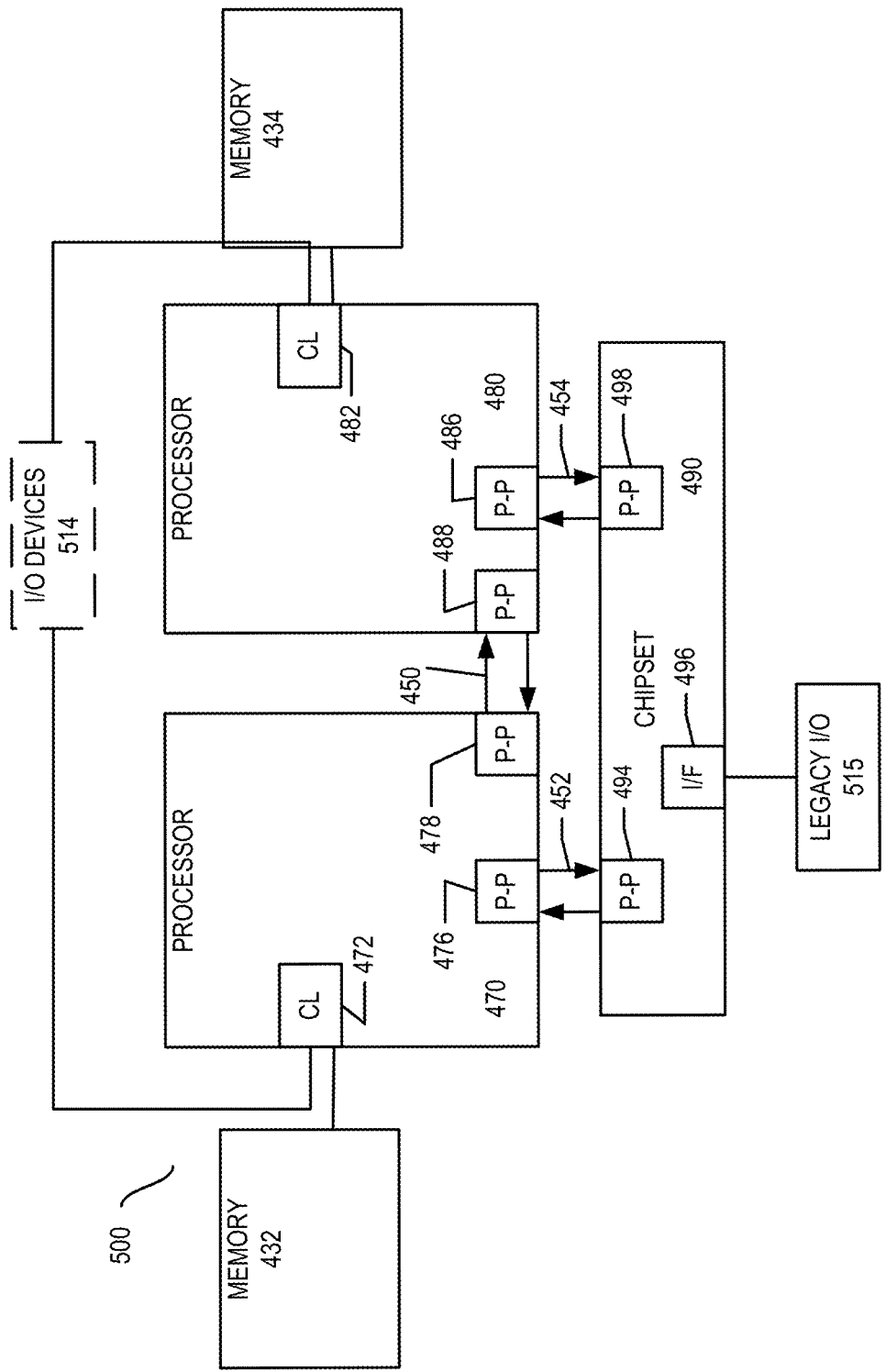
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
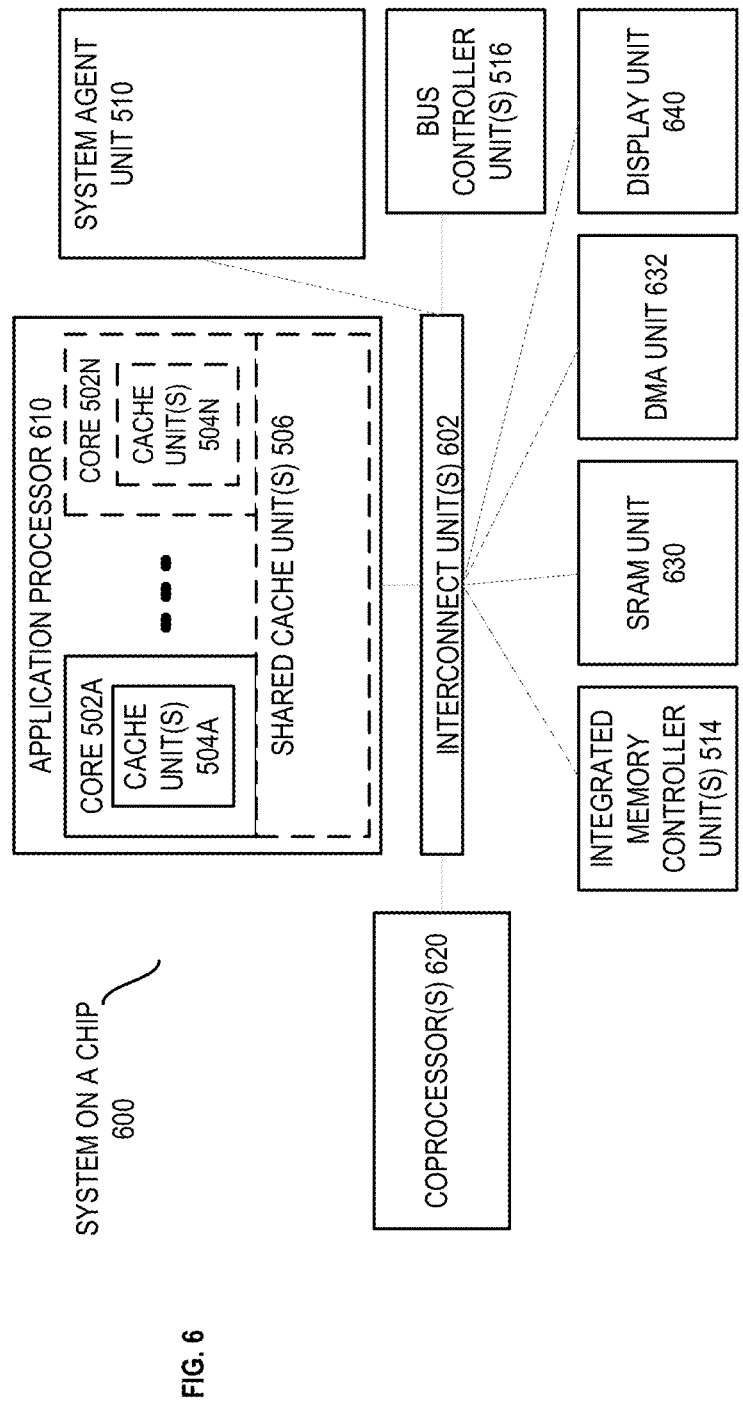
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
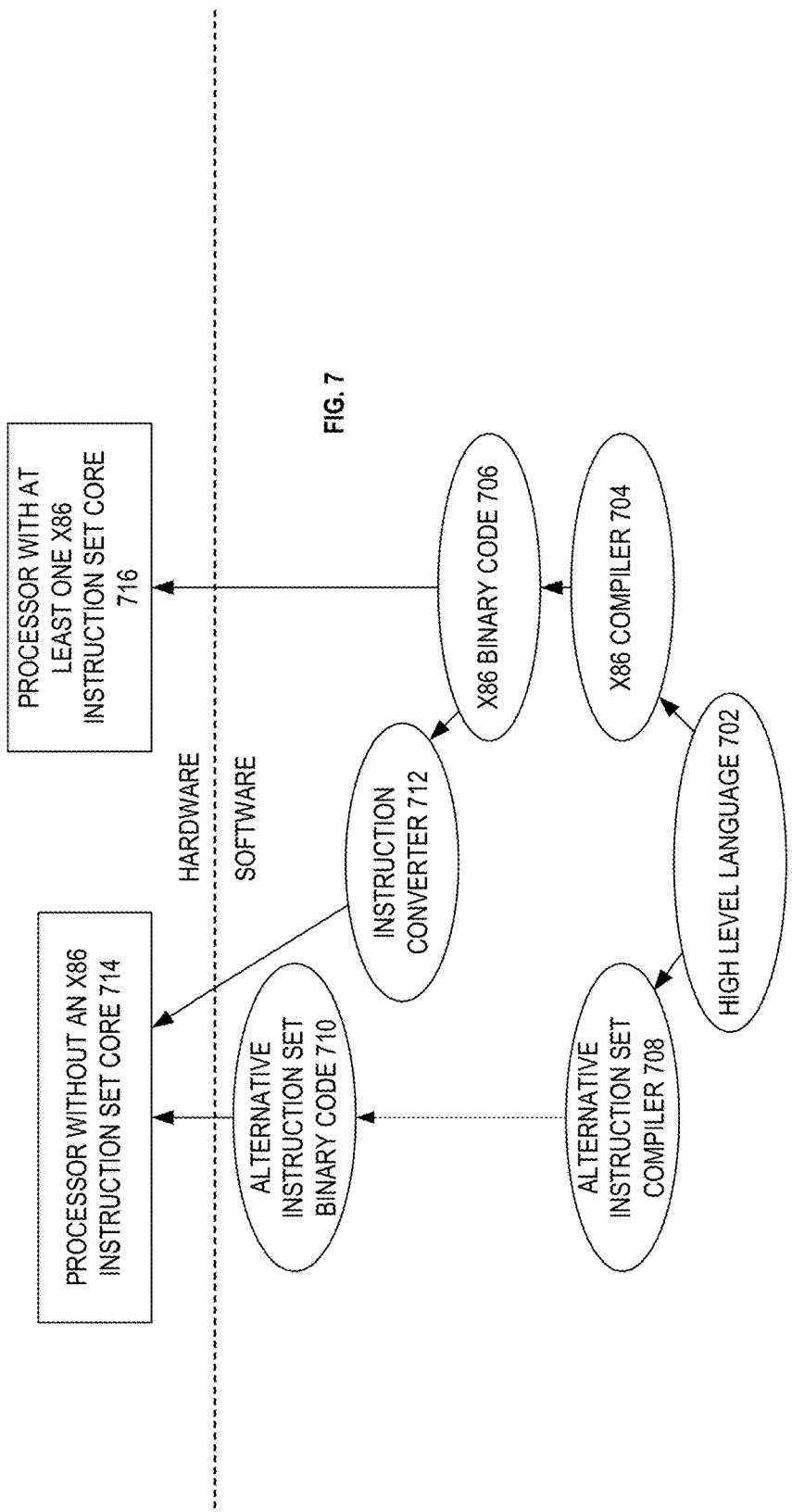
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Fine Grain Memory Protection

One embodiment of the invention reduces the volume of memory violations due to page-sharing using techniques which allow the VMM to write-protect sub-page regions of any page. In one embodiment, each memory page is 4 k in size and the sub-page regions are 128B. However, the underlying principles of the invention are not limited to any particular sub-page region or page size.

In one embodiment, the permissions for each sub-page region are maintained in a VMM-managed table. With a 128B granularity for sub-pages, no-write and no-execute permissions may be expressed in a 64 bit value (e.g., with 2 bits allocated to each sub-page, one indicating no-write and one indicating no-execute).

Figure 8:
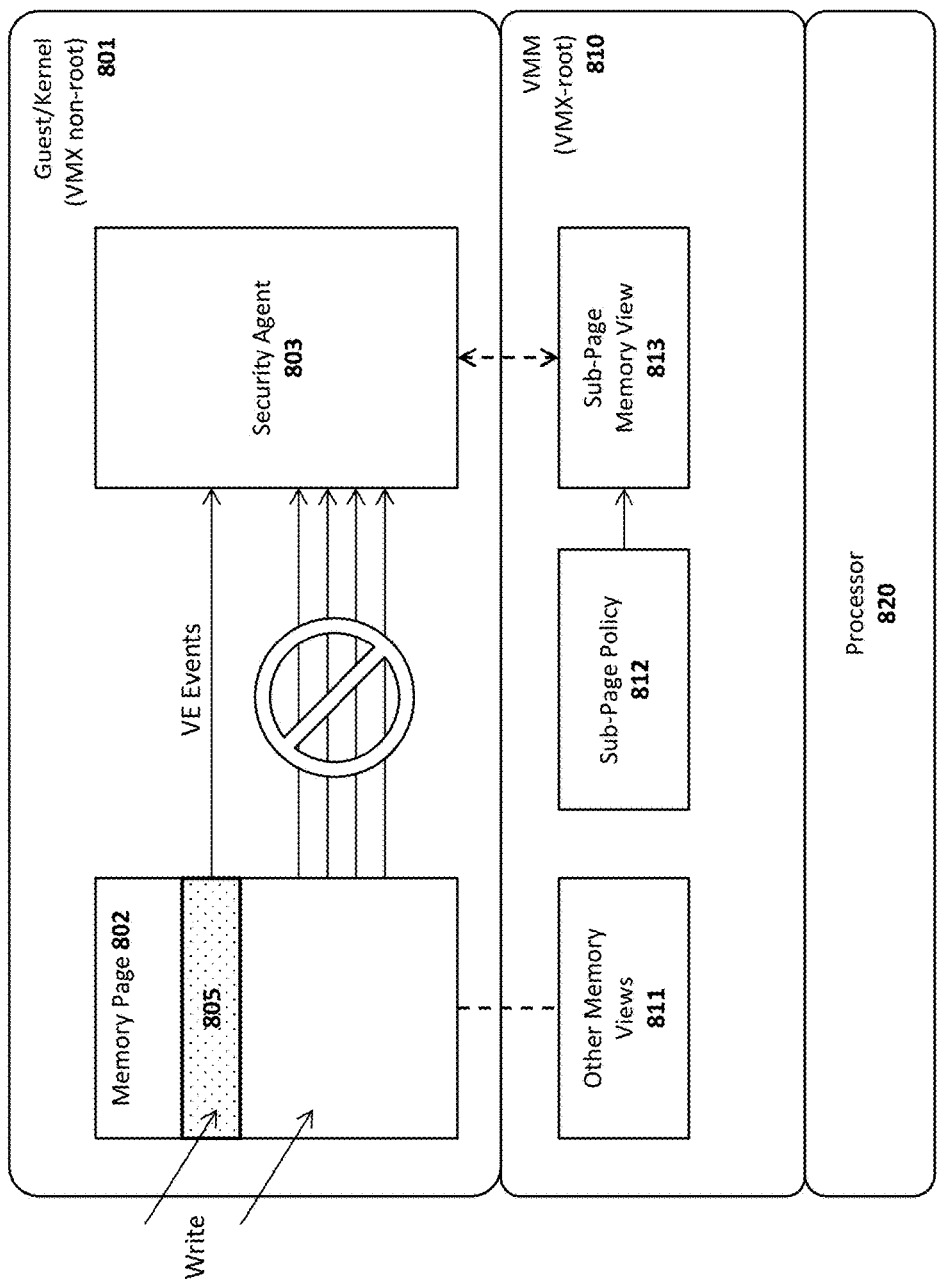
FIG. 8 illustrates one embodiment of an architecture for fine grain memory protection.

FIG. 8 illustrates one embodiment comprising a VMM 810 executed on a processor 820 to provide an execution environment for one or more guests, which may be OS kernels 801. In one embodiment, a sub-page policy module 812 within the VMM (e.g., VMX-root) implements the techniques described herein to generate a sub-page memory view 813, indicating permissions for sub-pages within each memory page. A security agent 803 (e.g., an in-band agent) executed within the OS kernel 801 utilizes the sub-page memory view 813 to determine which pages and sub-pages need to be monitored. For example, as discussed in detail below, each sub-page may have a write permission bit to indicate whether writes to that sub-page are permitted. Alternatively, a write-protect bit may be set to indicate that writes are not permitted.

As a result, instead of processing every VE event directed to a memory page 802, the security agent 803 is provided with information that allows it to process only those events (e.g., write operations) directed to specific sub-pages within the memory page 802. For example, in FIG. 8, only the sub-page(s) within the highlighted region 805 of the memory page 802 are relevant to the security agent 803. Thus, the security agent 803 processes VE events occurring within this region but filters out events occurring in the other regions (e.g., because write permissions are set for those sub-pages). Other memory views 811 managed by the VMM represent standard memory page views traditionally provided by the VMM to guest systems (e.g., such as kernel 801).

Figure 9:
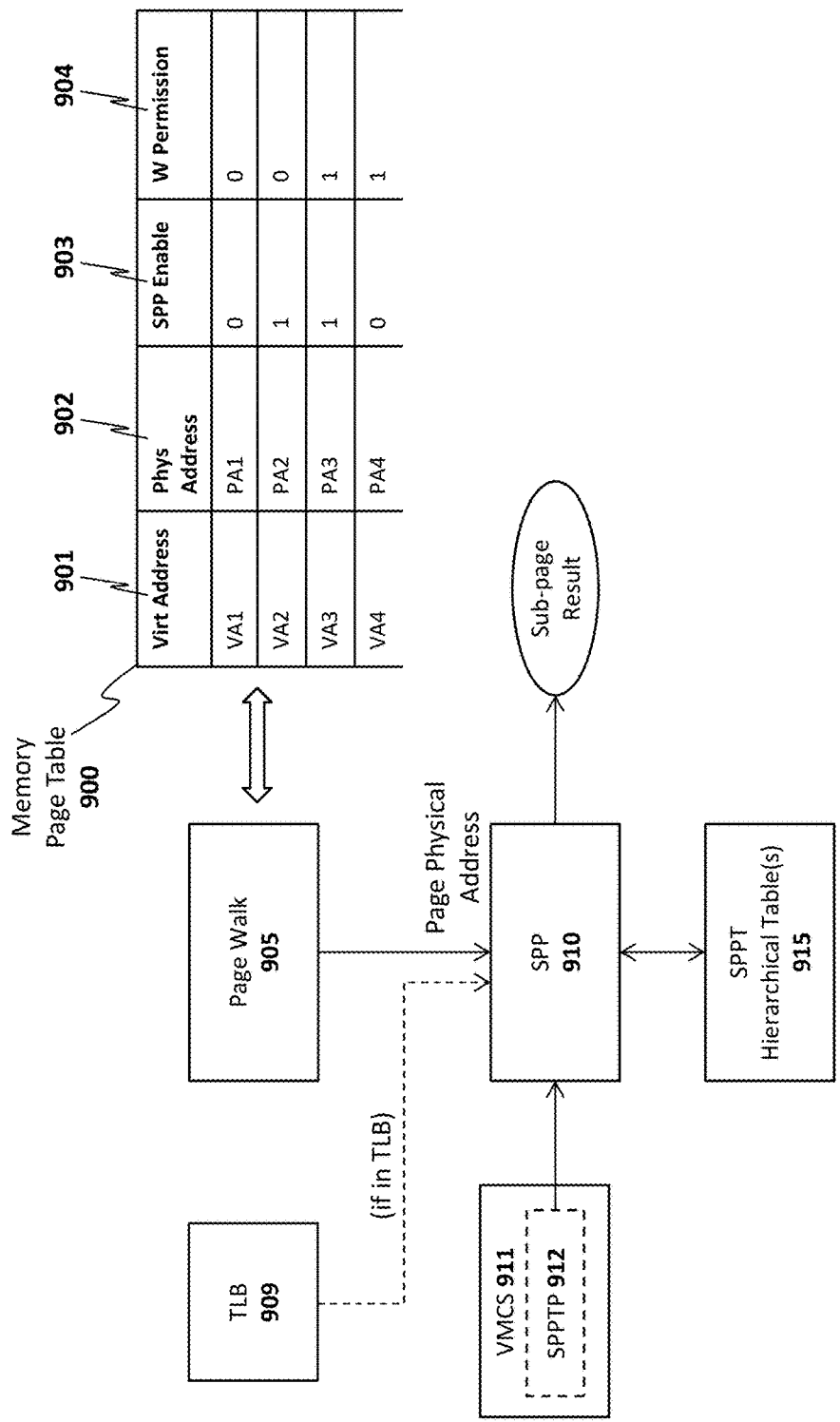
FIG. 9 illustrates additional details employed in one embodiment for fine grain memory protection.

Additional details of one embodiment of the invention are illustrated in FIG. 9 which shows a page table 900 with mappings between memory page virtual addresses 901 (also sometimes referred to a linear addresses) and physical addresses 902 (also sometimes referred to as real addresses). In one embodiment, the page table 900 comprises an extended page table (EPT) employed in current x86 architectures. Page walk logic 905 may perform a "page walk" operation to access the page table 900 using a virtual address and identify the physical address corresponding to that virtual address. In one embodiment, the page walk logic 905 comprises a page miss handler (PMH) integrated within the memory management unit (MMU) of the processor. Once the physical address is identified, the location of the memory page may be accessed at the specified physical location in memory.

Page table entries may be cached in a translation lookaside buffer (TLB) 909 within the processor for faster access. If a page table entry is located within the TLB, the physical address of the page may be determined directly by the memory management unit (MMU) of the processor without the need for a page walk (which typically involves accessing the page table 900 from system memory and therefore consumes significantly more cycles). The underlying principles of the invention are the same regardless of whether information related to the page is retrieved from the TLB 909 or directly from the page table 900. Various other components commonly used for virtual-to-physical address translations are not illustrated in FIG. 9 to avoid obscuring the underlying principles of the invention.

In one embodiment of the invention, a SPP enable bit 903 included within each of the page table entries indicates whether sub-page protection applies to the corresponding memory page. For example, in the page table 900 in FIG. 9, the SPP enable bit is set to 1 for the entries associated with VA2 and VA3. In one embodiment, if SPP is enabled for a particular page, then a sub-page protection (SPP) module 910 implements the techniques described herein to perform a lookup in one or more sub-page protection tables 915. In one embodiment, to perform the lookup, the sub-page protection module 910 combines the physical address of the page (provided from the page walk module 905 or TLB 909) with a sub-page protection table pointer (SPPTP) 912 which identifies the base location of the SPPT 915 in memory. In one embodiment, the SPPTP 912 is a 64-bit field within the virtual machine control structure (VMCS) 911. However, the SPPTP may be implemented in a variety of different ways while still complying with the underlying principles of the invention.

In one embodiment, a write permission bit 904 (and potentially one or more other permission bits) associated with each page may also be used to determine permissions for that page in combination with the sub-page protection table(s) 915. For example, in one embodiment, the page-level permissions 904 are combined with the sub-page write protections (specified in the SPPT 915) to determine the write permissions for each sub-page. For example, in one embodiment, if the write permission 904 for the page is set to 0, then writes are not permitted for sub-pages unless the write permission bit is set to 1 in the sub-page protection table. In another embodiment, if the write permission 904 for the page is set to 0, then writes are not permitted for sub-pages, regardless of the settings indicated in the sub-page protection table. Similarly, if the write permission 904 for the page is set to 1, then writes are permitted for sub-pages unless the write permission bit is set to 0 in the sub-page protection table 915. In another embodiment, if the write permission 904 for the page is set to 1, then writes are permitted for all sub-pages, regardless of the settings indicated in the sub-page protection table. Thus, the write permission bit 904 and sub-page protection bit may be combined in various ways to determine write permissions for each sub-page.

In one embodiment, the SPPT 915 comprises a hierarchy of tables, each of which is indexed by a different portion of a memory page's physical address. A lookup according to one such embodiment is illustrated graphically in FIG. 10. As illustrated in this embodiment, the SPPTP 912 is combined with the highest physical address bits of the physical address to identify an entry in a level 5 (L5) table. The address contained in that entry is the base address for the level 4 (L4) table. The entry in the L4 table is located by combining the base address with bits 39-47 of the physical address of the page. The L4 entry identifies the base address of the L3 table and is combined with bits 30-38 of the physical address to identify the entry in the L3 table which contains the base address of the L2 table. Bits 12-29 are then combined with this base address to identify the entry in the L2 table, which identifies the base address of the L1 table. The 64-bit sub-page (SP) vector containing all sub-page permissions for the page is identified by combining the base address for the L1 table with bits 12-20 of the physical address. The write permission bit is then identified within the 64-bit SP vector using physical address bits 7-11. In one embodiment, the 64-bit SP vector contains two bits associated with each sub-page, one to indicate write permission (e.g., 1=write permitted; 0=write protected), and the other to indicate one or more additional permissions for the sub-page (e.g., execute protection and/or permissions).

Figure 10:
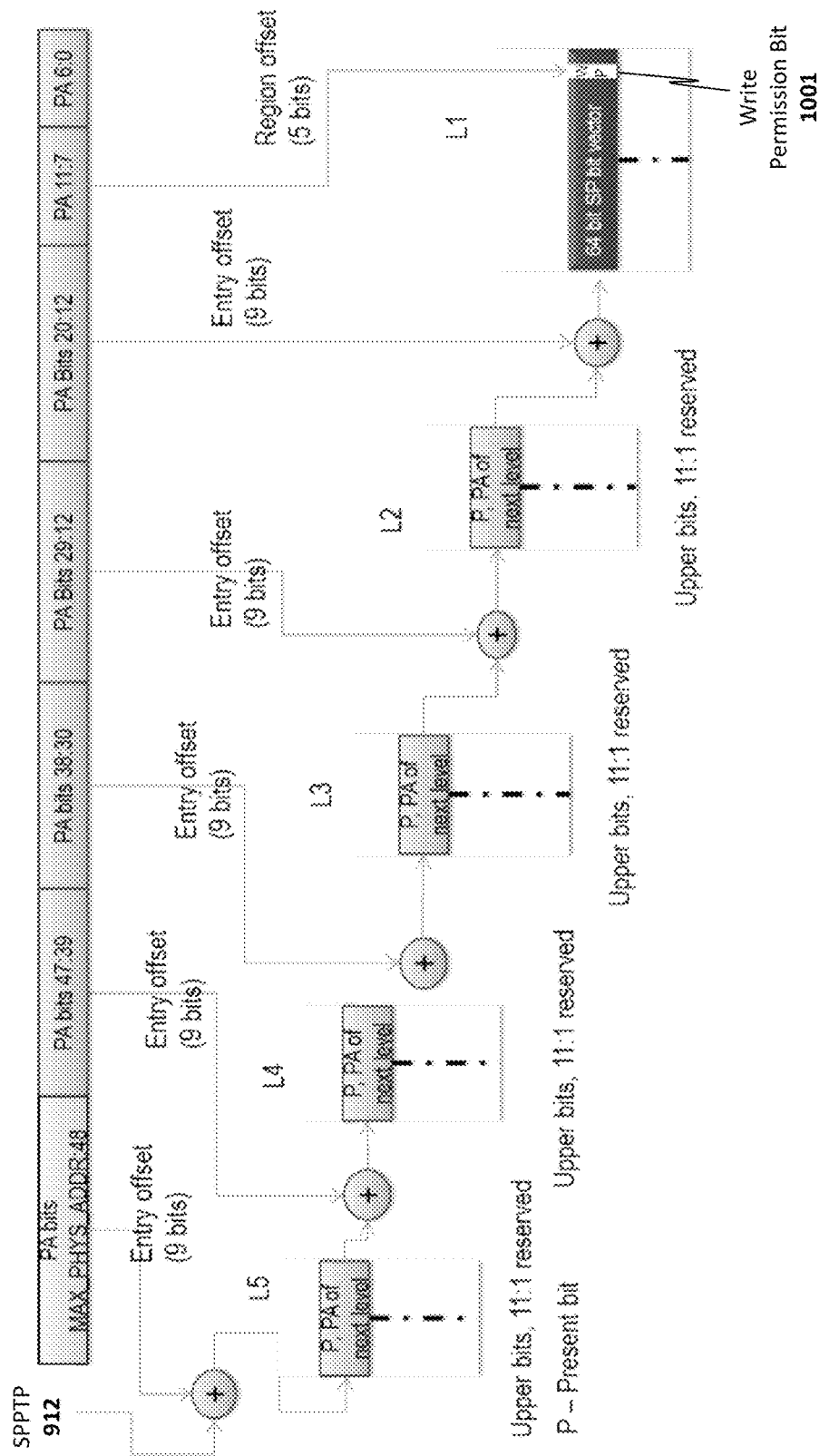
FIG. 10 illustrates lookups performed in a hierarchical table structure in one embodiment.

It should be noted that the specific details are shown in FIG. 10 for the purposes of explanation of one embodiment of the invention. However, the underlying principles of the invention are not limited to the specific details shown in FIG. 10. For example, the different address bits associated with each memory page may be combined in alternate ways to perform lookups in various different types of table structures (non-hierarchical as well as hierarchical) while still complying with the underlying principles of the invention.

Figure 11:
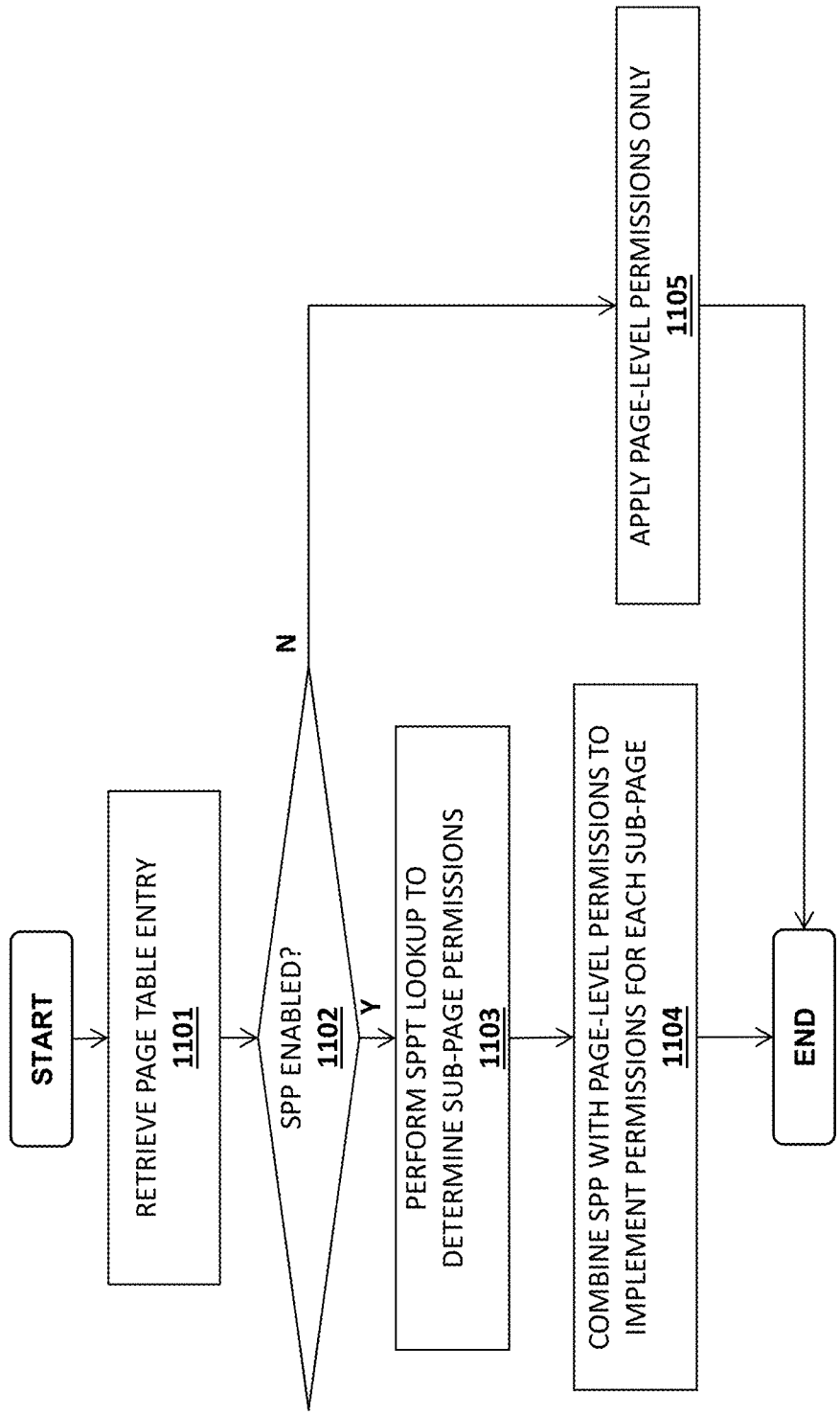
FIG. 11 illustrates one embodiment of a method for fine grain memory protection.

A method in accordance with one embodiment of the invention for determining sub-page protection is illustrated in FIG. 11. The method may be implemented within the architectures described above, but is not limited to any particular system architecture.

At 1001, the page table entry associated with a memory page is retrieved. For example, as discussed above, the page table entry may be read from the TLB or may be fetched from the page table stored in memory. At 1102, a determination is made as to whether sub-page protection is enabled. For example, as mentioned above, a sub-page protection bit may be set in the page table entry to indicate sub-page protection. If sub-page protection is not enabled, then at 1105 only page-level permissions/protections are implemented.

If sub-page protection is enabled, then at 1103, a lookup is performed in a sub-page protection table (SPPT) to determine permissions/protections associated with each sub-page. As mentioned above, this may include write permissions, execute permissions, or any other permissions/protections capable of being implemented with respect to a sub-page. At 1104, the sub-page protection indication is combined with page-level permissions/protections (if any) to arrive at a final set of permissions for each sub-page.

The following specific details are implemented to provide sub-page protections/permissions in one embodiment of the invention. It should be noted, however, that the underlying principles of the invention are not limited to these specific details.

In one embodiment, the SPP bit used in the page table comprises a bit which is defined only for EPT paging-structure entries that map a page (e.g., 4 KB extended page table (EPT) page table entries). The bit is ignored in other EPT paging-structure entries.

As mentioned, accumulated page-level EPT write permissions/protection may be combined with sub-page write permissions/protection to determine write permissions/protections for that sub-page. In one embodiment, the processor checks this write permission and generates EPT violations as appropriate.

Additional SPPT Lookup Features:

If an SPPT entry is not present, this may cause a new virtual machine exit. In one embodiment, this would occur only for lazy population of SPPT by VMM. On a miss, in one embodiment, the physical address may be saved in the VMCS (to be used as a cache for subsequent requests). A VM exit would otherwise save data as EPT violations currently do (e.g., NMI blocking, IDT vectoring, etc.)

If there is no miss, then the SPPT walk may identify a 32-bit write permission bitmap for page. The processor may cache the bitmap in data translation lookaside buffer (DTLB) or related/other structure for subsequent accesses.

SPPT Invalidation Features:

In one embodiment, the VMM may modify the sub-page protection bits in the SPPT and may invalidate combined mappings via the INVEPT instruction. This also causes flush of cached sub-page permissions. In one embodiment, an extended page table pointer (EPTP) switch (e.g., via execution of VMWRITE or VMFUNC instructions) may cause flush of any information cached about sub-page permissions. This may entail TLB flushing for address space ID (ASID) miss cases (e.g., with a new ASID being allocated). In one embodiment, entries are also invalidated in non-ASID-tagged structures (e.g., the data TLB, extended page directory pointer (EPDP) and extended page directory entry (EPDE) caches).

Address(A)/Data(D) Bit Update Handling:

In one embodiment, sub-page protection (SPP) pages are considered "read-only" for guest paging structures and virtualized advanced programmable interrupt controller (APIC) accesses. For Intel Architecture (IA)-32 A/D-bit updates: (a) If a guest A/D-bit update is to be made to an SPP page, an EPT violation is generated; (b) the exit qualification is the same as if the page had been read-only in the EPT (no new data); (c) the VMM can handle such EPT violations with existing mechanisms. For EPT A/D-bit architecture: (a) if EPT A/D bits are enabled, guest page walks may be considered writes for EPT; (b) if the EPT A/D bits are enabled, then a guest page walk to an SPP page causes an EPT violation; (c) an enlightened OS that interfaces with a VMM to monitor OS page tables can use subpage protection efficiently by pre-setting A/D bits on pages containing critical mappings so that the VMM does not have to emulate A/D updates on write-protected pages that have sub-page monitored regions.

Writes to Single Page, with Multiple Sub-page Regions Accessed:

One example of this is an 8-byte MOV that is 4-byte aligned within a page. In one embodiment, the processor will check the writeability of both sub-pages. If both sub-pages are writeable, the write is allowed. If either sub-page is not writeable, the write causes an EPT violation.

Writes Spanning Multiple Pages:

One example of this is an 8-byte MOV that is 4-byte aligned straddling the page boundary. In one embodiment, the processor will check whether either page has sub-page protections. If neither page has sub-page protections, the write is handled normally per the EPT. If either page has sub-page protections, the write causes an EPT violation.

Handling Instructions with Multiple Writes:

One example of this is the FXSAVE instruction which may generate multiple writes to multiple pages. The processor may treat store probes just like any other store. In one embodiment, the processor will generate an EPT violation if specific address probed is not writeable. This can result in EPT violations occurring after some data is written.

In one embodiment, a change store probes to cause EPT violations if page probed has sub-page protection. In one embodiment, the processor probes high and low bytes before doing any writes.

APIC Virtualization Interaction:

Advanced Programmable Interrupt Controller (APIC) interactions may result if the VMM configures an EPT PTE so that the physical address is in the "APIC-access address" and SPP=1. In one embodiment, this is considered an invalid usage. The full APIC virtualization provides fine-grained control without sub-page protection.

Interaction with EPTP Switching:

In one embodiment, the sub-page protection table pointer (SPPTP) is not changed on an extended page table pointer (EPTP) switch. The current use case requires specific EPT hierarchies to have access to the !W subpage. This is achieved via EPTE SPP bit set to 0 for these EPT hierarchies.

In one embodiment, the SPPT may be switched via a new VMFUNC instruction that switches the following via a memory descriptor:

<CR3, EPT, SPPT>VMFUNC leaf 2
<CR3, EPT>VMFUNC leaf 1
<EPTP>VMFUNC leaf 0

Additional Embodiments:

The architecture described above can be mapped to various implementations. A straight mapping of the proposed architecture to a processor implementation is one that performs a lookup of the SPPT due to the processor page miss handler (PMH) walking a paging structure that has the SPP bit set in the EPT structure. An alternate implementation embodiment which does not require the SPP bit in the EPT is as follows. The VMM allocates a chunk of contiguous memory area that it reserves for use as a "sub-page monitorable pool" of pages. When the OS or an OS service wants a page that either requires subpage monitoring or is dynamically setup to be monitored at the subpage level, the OS service requests that the VMM assign one of these pool pages. The VMM maps the guest physical address (GPA) of the OS mapping (in the OS PT), to the assigned page's hidden physical address (HPA) from the pool of pages. In some environments, the VMM may copy the contents from original GPA page to the page assigned from this pool. The VMM also programs one of the processor's range registers base and mask to cover the contiguous memory region. The range register allows the processor to detect when a RW or X access is made to one of the pages in the pool. The VMM additionally programs the SPPT as defined in the architecture above to specify the per page sub-page policies for all pages within this pool. In one embodiment, any RW or X access to any page within the memory region causes a processor microcode assist in which the CPU checks against the subpage policy for that HPA in the SPPT, and allows or disallows the access.

Software Implementations:

In one embodiment, when sub-page permissions are desired for a set of pages, the VMM populates the SPPT with mappings for this set of pages specifying the subpage permission bit vector for each page. For accesses falling within write-disallowed sub-page regions, the VMM handles induced EPT violations or the guest software handles induced virtualization exceptions (#VEs). For accesses falling within write-allowed sub-page regions, no induced EPT violation or #VE is generated.

Nested Virtualization Interactions:

In one embodiment, the root VMM may not be enabled for SPPT. In this case, it doesn't expose it and does not virtualize it. In another embodiment, the root VMM is enabled for SPPT but is not using the SPPT itself but is virtualizing it. In another embodiment, the root VMM is enabled for SPPT and is using it itself, but is not exposing it to guest entities. Here there are no SPPT nesting implications. In yet another embodiment, the root VMM is enabled for SPPT, is using it itself, and is exposing it to guest entities (e.g., virtualizing it). These last two embodiments are described in greater detail in the below sections.

Root VMM Enabled for SPPT, not using it itself, but Virtualizing it:

In one embodiment, the root VMM shadows the SPPT structure to keep all references to the HPA (including the SPPT). Since the SPPT is accessed via general memory access instructions, the root VMM will need to edit-control SPPT guest memory pages. The guest VMM must perform an INVEPT instruction (EPTP context) after updating the SPPT which can be virtualized correctly by the root VMM. In one embodiment, the INVEPT instruction clears any SPPT cache (for the same scope), global, EPTP, and specific address (if supported).

Root VMM Enabled for SPPT, using it itself, and Exposing it to Guest:

In this embodiment, the root VMM shadows the SPPT structure to keep all references to the HPA (including the SPPT). For conflicting SPPT policies, the root VMM may encode the most conservative combination into the SPPT used by the processor for violations due to guest SPPT. The root VMM may emulate #VE/VMexit to the guest VMM. Since the SPPT is accessed via general memory access instructions, the root VMM will need to edit-control the SPPT guest memory pages. The guest VMM may perform an INVEPT instruction (EPTP context) after updating the SPPT which can be virtualized correctly by the root VMM. In one embodiment, the INVEPT instruction may clear any SPPT cache (for the same scope), global, EPTP, and specific address (if supported).

FIG. 12 illustrates an SPP bit vector employed in one embodiment of the invention in which read (R), write (W), execute disable (XD), and dirty (D) bits can be expressed in a 64-bit vector. As illustrated, in one embodiment, the even bits are used for determining W and XD indicators and the odd bits are used for determining R and D indicators. The table 1202 illustrated in FIG. 12 shows the different results for different values of R, W, and XD (e.g., with a value of 1 indicating enabled and a value of 0 indicating disabled). In one embodiment, the CPU may simply update the DIRTY (D) bit for the sub-page written to and may not cause a Fault.

Method and Apparatus for Sub-Page Extended Page Table (EPT) Write Protection

Extended Page Table (EPT)-based Sub-Page Protection allows VMMs to specify write-protection for guest physical memory at a sub-page (e.g., 128 byte) granularity. When this capability is utilized, the CPU enforces write-access permissions for sub-page regions of 4K pages as specified by the VMM. EPT-based Sub-Page Protection is intended to enable fine-grained memory write enforcement by a VMM for security (guest OS monitoring) and usages such as device virtualization and memory checkpointing.

Current processors implement a TLB cache in the memory subsystem to cache linear address to physical address translations. On some processors, the finest granularity of translation is 4K bytes which is also the smallest granularity at which page table translations can be set up. The EPT sub-pages extend this with 32 write permission bits—one for each 128B region in that page—instead of a single write permission bit for the entire page. A natural extension to support this architecture is to have a new type of TLB in the processor that holds the 32 new write permission bits and to test the appropriate write permission bit depending on the address and operand size specified by load or store uops. However, providing an entirely new TLB structure or augmenting the TLB structure where each entry of the data TLB now has 32 additional permissions is expensive.

Another technique is that upon accessing a TLB with sub-page permissions, a microcode assist is invoked by the page miss handler (PMH). The microcode assist verifies the offset and data size of the access and, if the access is a valid access as determined by the write permission bits, restarts the instruction after programming the PMH hardware to not cause a microcode assist on the next store to that hits that TLB entry. However, such a solution is not feasible on certain microarchitectures that lack the guarantee that the instruction cache is inclusive of all micro-operations including loads/stores in flight in the machine. Thus if an instruction is restarted on one of these cores, the restarted instruction may not be found in the instruction cache 134 and the front end unit 130 may be required fetch the instruction from memory again and the instruction at that address may have changed in memory. If the instruction has changed and if the re-fetched instruction accesses an invalid location in the sub-page, the access would go through since the hardware would allow the next access to any offset in the page.

The embodiments of the invention introduce a novel solution to implement sub-page matching such that the correct operation can be performed without having the instruction inclusion guarantees. In particular, one embodiment includes a microarchitecture which performs sub-page granular access control using a microcode assist without requiring instruction inclusion guarantees.

Figure 13:
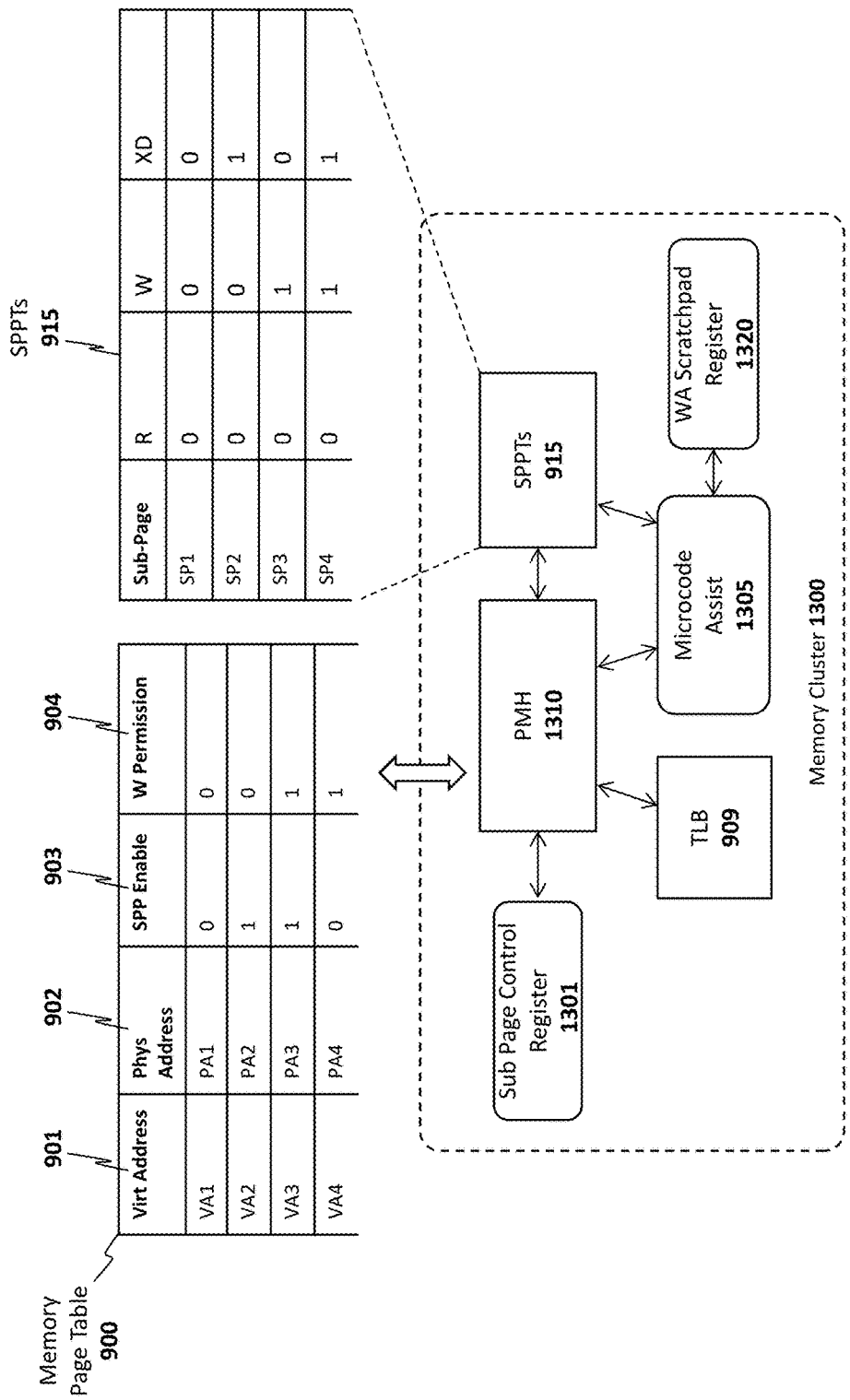
FIG. 13 illustrates one embodiment of an apparatus for implementing sub-page protection.
Figure 14:
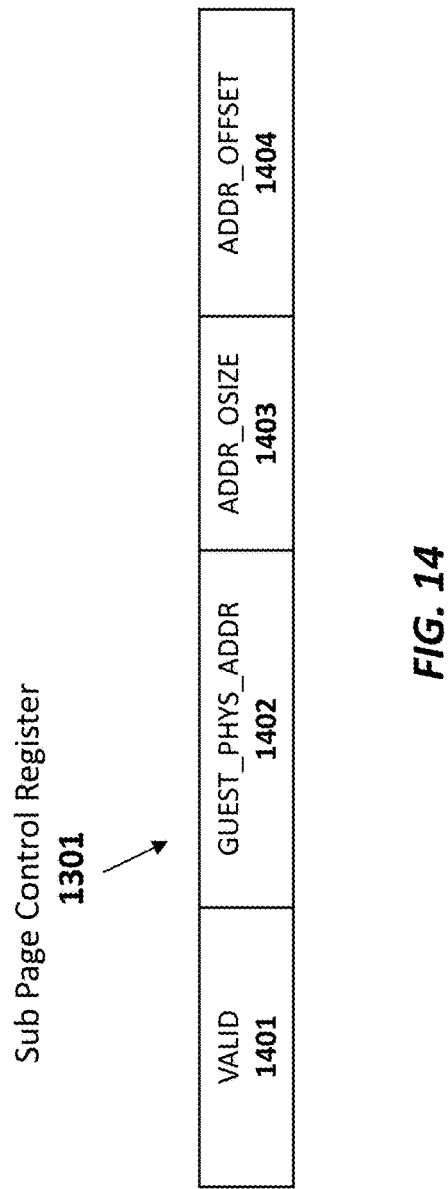
FIG. 14 illustrates values within a sub-page control register in accordance with one embodiment of the invention.

As illustrated in FIG. 13, in one embodiment, the memory cluster 1300 (e.g., the processor's memory management unit) is extended to allow matching a programmable offset on a EPT sub-page page 915 using a sub-page control register 1301 (CR_SUB_PAGE) that utilizes the below fields, illustrated in FIG. 14, to control operation of the embodiments of the invention:

1. VALID 1401—A bit that indicates whether the control register is valid.
2. GUEST_PHYS_ADDR 1402—The guest physical address of the EPT sub-page.
3. ADDR_OSIZE 1403—The operand size of the store that should be allowed to complete when it is to the page whose address is programmed into the GUEST_PHYS_ADDR field 1402.
4. ADDR_OFFSET 1404—The offset of the first byte of the store that should be allowed to complete when it is to the page whose address is programmed into the GUEST_PHYS_ADDR field 1402.

In one embodiment, the PMH 1310 performs an EPT page walk and detects that the page containing the guest physical address (GPA) is mapped with sub-page permissions in the EPT. If mapped with sub-page permissions, then it determines whether the GPA matches the GPA programmed into the sub-page control register 1301 (CR_SUB_PAGE). If so, the PMH 1310 sends a translation to the TLB 909 with the SPP bit set to indicate that this is a sub-page TLB entry. If no match is found then a microcode assist 1305 is invoked (as described below).

In particular, one embodiment of the invention performs the following set of operations:

```
IF EPT_WALK_FOR_FINAL_GPA AND IS_SUB_PAGE == 1 AND
access is a data load or store
    IF GPA[Max_Phys_Addr-1:12] ==
    CR_SUB_PAGE.GUEST_PHYS_ADDR
        AND
        CR_SUB_PAGE.VALID == 1
        // GPA matches CR_SUB_PAGE - mark as SPP TLB
        TLB_REPLY.APIC = 0
        TLB_REPLY.SPP = 1
    ELSE
        // GPA does not match CR_SUB_PAGE - invoke
        microcode assist
        CR_FAULT_REG1.SUB_PAGE_FAULT = 1
        CR_FAULT_REG0 = Linear_Address
        CR_GPA_ADDRESS = GPA
        Invoke Sub page Microcode assist
    ENDIF
ENDIF
```

Thus if the GPA of the walk for a page mapped with sub-page attribute in the EPT matches the GPA programmed into the CR_SUB_PAGE 1301, the PMH 1310 sends a translation to the TLB 909 with the SPP bit set to indicate this is a sub-page TLB entry. If no match is found then a microcode assist 1305 is invoked.

In one embodiment, when a load or store matches a TLB entry with the SPP bit set, the offset and operand size may be matched in the SPP control register 1301. If the offset and operand size do not match, then microcode assist 1305 may be invoked to perform fault checking. In particular, the following actions may be performed for a match by the TLB 909:

```
// Match the Offset and operand size in the SPP control
register
// Can happen in parallel to LA lookup in UTLB
IF LA[11:7] == CR_SUB_PAGE.ADDR_OFFSET AND
    Operand_Size == CR_SUB_PAGE.ADDR_OSIZE
        SPP_MATCH = 0x01
    ENDIF
// Lookup UTLB
UTLB_LOOKUP_RESULT = LOOKUP_UTLB(Linear_Address)
// If the Offset and Osize do not match then invoke
microcode assist as part of fault checking
IF UTLB_LOOKUP_RESULT.SPP == 1 AND
    Access_Type == Store AND SPP_MATCH == 0
    // Offset or size does not match SPP control register
    // - invoke microcode assist
    CR_FAULT_REG1.SUB_PAGE_FAULT = 1
    AGU_CR_FAULT_REG1.UTLB = 1
    DCU_CR_FAULT_REG0 = Linear_Address
    Invoke Sub page microcode assist
ENDIF
```

In one embodiment, when the microcode assist is invoked by the PMH 1310 or TLB 909, microcode walks the sub-page permission table 915 and programs the CR_SUB_PAGE register 1301 with an offset and operand size if the sub-page permission table 915 indicates that the offset accessed by the assisting store was writeable. Otherwise, it causes an EPT violation fault to notify the VMM. In one embodiment, when the microcode assist was triggered by the PMH 1310 then the microcode caches the 32 write-permission bits into a write-allowed (WA) scratchpad register 1320. One embodiment is implemented in accordance with the following code:

```
// If assist from PMH then walk the SPPT. Otherwise the //
WA bits are already cached
IF AGU_CR_FAULT_REG1.UTLB = 0
    // Assisted from PMH. Invalidate the TLB to remove
    //any other sub-page translations that may be
    // residing in the TLB. We can only have one sub-page
    // TLB in the TLB as CR_SUB_PAGE tracks only a
    // single sub-page translation
    Invalidate TLB
    GPA = CR_GPA_ADDRESS
    Walk sub-page permission table to get the 32-bit sub-
    page write permissions and save it into a scratchpad
    register 1320 SCP_CR_SPP_WA
    //prepare to write the SPP control register
    PAGE_ADDR = GPA[Max_Phys_Addr-1:12]
ELSE
    //Assist is from TLB. We already have write
    //permissions bits cached in SCP_CR_SPP_WA
    //SPP_WA_BITS = SCP_CR_SPP_WA
    PAGE_ADDR = CR_SUB_PAGE.PAGE_ADDR
ENDIF
// Check if accessed 128 byte region is writeable
test_bit_0 = (CR_FAULT_REG0[11:0] >> 7) * 2;
IF (SPP_WA_BITS & (1 << test_bit_0)) == 0
    // If write disallowed then VM exit
    Goto EPT_Violation
ENDIF
// If the access straddles 128 byte regions on same page
// then check next one. The NUM_BYTES contains the
// operand size of the faulting uop
test_bit_1 =
    ((CR_FAULT_REG0[11:0] +
        CR_FAULT_REG1.NUM_BYTES) >> 7) * 2
IF (SPP_WA_BITS & (1 << test_bit_1)) == 0
    // If write disallowed then VM exit
    Goto EPT_Violation
ENDIF
CR_SUB_PAGE.MATCH_OFFSET =
AGU_CR_FAULT_REG0[11:7]
CR_SUB_PAGE.MATCH_OSIZE =
AGU_CR_FAULT_REG1.NUM_BYTES
CR_SUB_PAGE.PAGE_ADDR = PAGE_ADDR
CR_SUB_PAGE.VALID = 1
Restart the macroinstruction
END
```

In accordance with the above embodiment, if the instruction is restarted and makes an access that does not match the offset and operand size programmed into CR_SUB_PAGE then it will cause an assist to microcode 1305 again.

Figure 15:
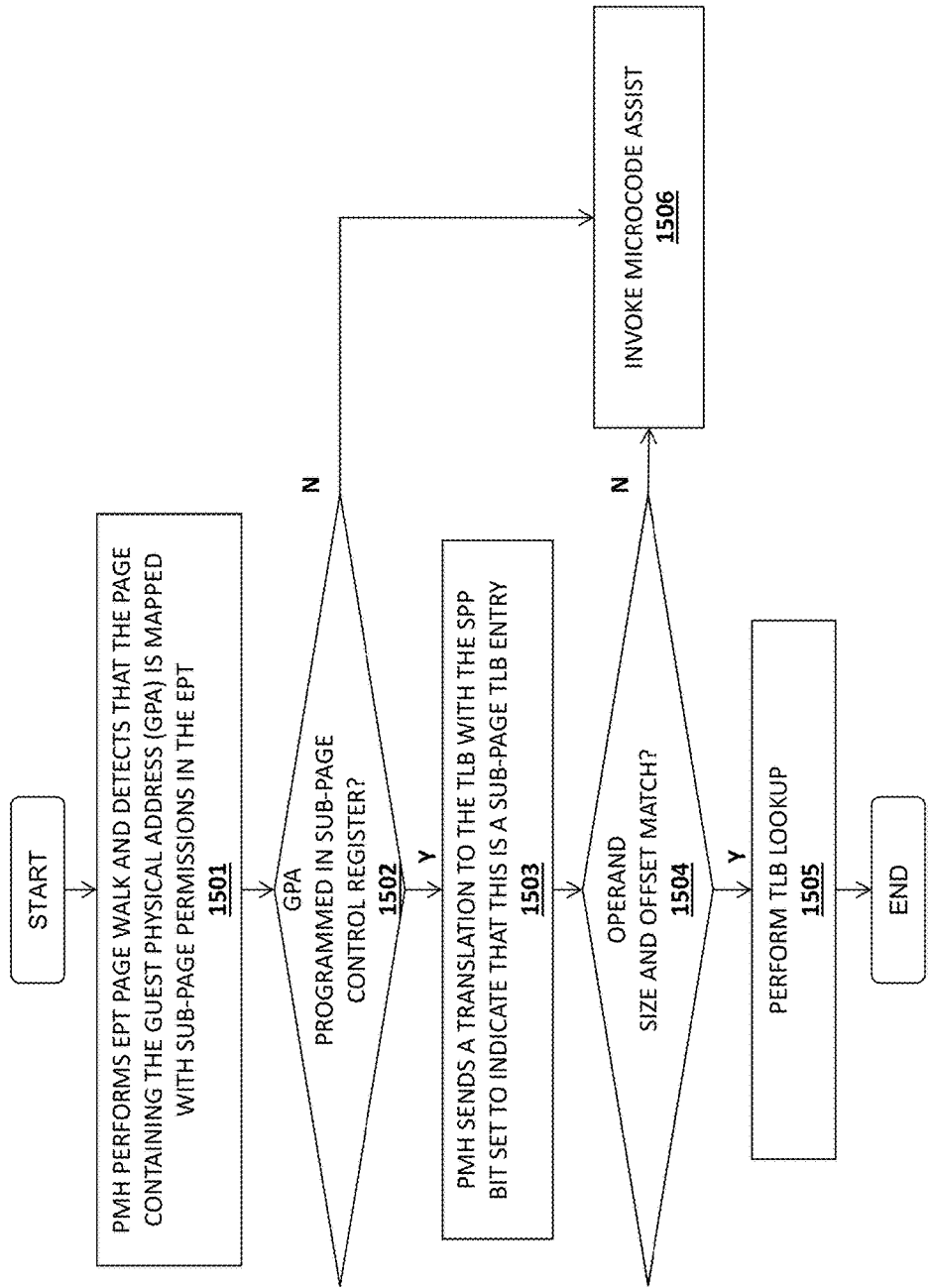
FIG. 15 illustrates a method in accordance with one embodiment of the invention.

A method in accordance with one embodiment of the invention is illustrated in FIG. 15. The method may be implemented within the context of the system architectures described above, but is not limited to any particular system architecture.

At 1501, the PMH performs an EPT page walk and detects that the page containing the GPA is mapped with sub-page permissions in the EPT. If the GPA is programmed in the sub-page control register, determined at 1502, then at 1503 the PMH sends a translation to the TLB with the SPP bit set to indicate that this is a sub-page TLB entry. If the GPA is not programmed in the sub-page control register, then at 1506, a microcode assist is invoked. A TLB lookup is performed at 1504. At 1505, if the sub-page protection bit is equal to 1 and there is an operand size and offset match, then the process completes. If not, then a microcode assist is invoked at 1506.

The embodiments of the invention provide for efficient, accurate sub-page management without the need for an instruction inclusion property or special TLBs with sub-page permissions.

While only a single sub-page control register 1301 is shown in FIG. 13 for simplicity, in some embodiments there may be a plurality of sub-page control registers 1301 to support multiple sub-page translations in the TLB simultaneously.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a memory management unit implemented in a circuit, including a page miss handler to perform a page walk using a guest physical address (GPA) and to detect, by checking one or more sub-page permission bits within a memory page table, whether a page identified with the GPA is mapped with the one or more sub-page permission bits that indicate walking a sub-page protection table being enabled for the page, and wherein the sub-page protection table indicates read and write permissions of sub-pages;
a sub-page control storage to store at least one GPA and other sub-page-related data including an offset and operand size for the GPA; and
a write-allowed scratchpad register,
wherein the page miss handler is to determine whether the GPA is identified in the sub-page control storage, and
the page miss handler is to send a translation to a translation lookaside buffer (TLB) with a sub-page protection indication set to cause a matching of the sub-page related data when there is a TLB hit, the sub-page protection indication indicating the translation is for a sub-page TLB entry, wherein the TLB is further configured to match the offset and operand size for the GPA in the sub-page control storage, if a TLB entry with the sub-page protection indication was hit for an access, and wherein the TLB is to invoke one or more microcode assist operations to perform fault checking if there is no match of the offset and/or operand size when an access matches a TLB entry with sub-page protection indication, and
wherein when the one or more microcode assist operations are invoked by the page miss handler, the one or more microcode assist operations cache write-permission bits for the GPA into the write-allowed scratchpad register.

2. The processor as in claim 1 wherein if the GPA is not programmed in the sub-page control storage, then the page miss handler to invoke one or more microcode assist operations to perform fault checking.

3. The processor as in claim 1 wherein when the one or more microcode assist operations are invoked, the one or more microcode assist operations walk the sub-page protection table and program the sub-page control storage with an offset and operand size if the sub-page protection table indicates that the offset accessed by an assisting store is writeable.

4. The processor as in claim 3 wherein if the assisting store is not writeable, then an extended page table violation fault is triggered to notify a virtual machine monitor.

5. The processor as in claim 1 wherein the sub-page control storage comprises a valid indication to indicate whether the data contained therein is valid, a GPA indication, an address operand size indication, and an address offset indication.

6. The processor as in claim 2 further comprising:
a front-end unit comprising a non-inclusive instruction cache to store an instruction which triggered the one or more microcode assist operations, the one or more microcode assist operations to cause the instruction to be re-executed.

7. A method comprising:
performing a page walk using a guest physical address (GPA) and detecting, by checking one or more sub-page permission bits within a memory page table, whether a page identified with the GPA is mapped with the one or more sub-page permission bits that indicate walking a sub-page protection table being enabled for the page, and wherein the sub-page protection table indicates read and write permissions of sub-pages;
storing at least one GPA and other sub-page-related data including an offset and operand size for the GPA in a sub-page control storage;
determining whether the GPA is identified in the sub-page control storage;
sending a translation to a translation lookaside buffer (TLB) with a sub-page protection indication set to cause a match against data programmed in the sub-page control storage when there is a TLB hit, the sub-page protection indication indicating the translation is for a sub-page TLB entry;

matching the offset and operand size for the GPA in the sub-page control storage, if TLB entry has a sub-page protection indication;

invoking one or more microcode assist operations to perform fault checking if there is no match of the offset and/or operand size; and caching write-permission bits for the GPA into a write-allowed scratchpad register when the one or more microcode assist operations are invoked.

8. The method as in claim 7 wherein if the GPA is not programmed in the sub-page control storage, then invoking one or more microcode assist operations to perform fault checking.

9. The method as in claim 7 wherein when the one or more microcode assist operations are invoked, the one or more microcode assist operations walk the sub-page protection table and programs the sub-page control storage with an offset and operand size if the sub-page protection table indicates that the offset accessed by an assisting store is writeable.

10. The method as in claim 9 wherein if the assisting store is not writeable, then an extended page table violation fault is triggered to notify a virtual machine monitor.

11. The method as in claim 7 wherein the sub-page control storage comprises a valid indication to indicate whether the data contained therein is valid, a GPA indication, an address operand size indication, and an address offset indication.

12. A system comprising:
a memory to store program code and data;
a processor to process the program code and data to implement a virtual machine monitor (VMM) and one or more guest operating systems (OSs) executed within one or more virtual machines (VMs) supported by the VMM, the guest OSs to utilize guest physical addresses (GPAs) to perform memory operations, the GPAs to be translated by the VMMs;
the processor further comprising:
a memory management unit implemented in a circuit, including a page miss handler to perform a page walk using a GPA and to detect, by checking one or more sub-page permission bits within a memory page table, whether a page identified with the GPA is mapped with the one or more sub-page permission bits that indicate walking a sub-page protection table being enabled for the page, and wherein the sub-page protection table indicates read and write permissions of sub-pages,
a sub-page control storage to store at least one GPA and other sub-page related data including an offset and operand size for the GPA; and
a write-allowed scratchpad register,
wherein the page miss handler is to determine whether the GPA is identified in the sub-page control storage, and
the page miss handler is to send a translation to a translation lookaside buffer (TLB) with a sub-page protection indication set to cause a matching of the sub-page related data when there is a TLB hit, the sub-page protection indication indicating the translation is for a sub-page TLB entry, wherein the TLB is further configured to match the offset and operand size for the GPA in the sub-page control storage, if a TLB entry with the sub-page protection indication was hit for an access, and wherein the TLB is to invoke one or more microcode assist operations to perform fault checking if there is no match of the offset and/or operand size when an access matches a TLB entry with sub-page protection indication, and
wherein when the one or more microcode assist operations are invoked by the page miss handler, the one or more microcode assist operations cache write-permission bits for the GPA into the write-allowed scratchpad register.

13. The system as in claim 12 wherein if the GPA is not programmed in the sub-page control storage, then the page miss handler to invoke one or more microcode assist operations to perform fault checking.

14. The system as in claim 12 wherein when the one or more microcode assist operations are invoked, the one or more microcode assist operations walk the sub-page protection table and programs the sub-page control storage with an offset and operand size if the sub-page protection table indicates that the offset accessed by an assisting store is writeable.

15. The system as in claim 14 wherein if the assisting store is not writeable, then an extended page table violation fault is triggered to notify the virtual machine monitor.

16. The system as in claim 12 wherein the sub-page control storage comprises a valid indication to indicate whether the data contained therein is valid, a GPA indication, an address operand size indication, and an address offset indication.

* * * * *